April 2, 1935. M. G. BOERGER 1,996,566
MACHINE FOR FABRICATING RADIATOR CORES
Filed Nov. 22, 1932 6 Sheets-Sheet 2

Witness:
V. Siljander

Inventor
Martin G. Boerger
By:
Hill & Hill Attys.

April 2, 1935.　　　M. G. BOERGER　　　1,996,566
MACHINE FOR FABRICATING RADIATOR CORES
Filed Nov. 22, 1932　　　6 Sheets-Sheet 3

Inventor
Martin G. Boerger
By:
Hill & Hill   Attys.

April 2, 1935.  M. G. BOERGER  1,996,566
MACHINE FOR FABRICATING RADIATOR CORES
Filed Nov. 22, 1932   6 Sheets-Sheet 4

Inventor
Martin G. Boerger
By:
Hill & Hill  Attys

April 2, 1935.  M. G. BOERGER  1,996,566
MACHINE FOR FABRICATING RADIATOR CORES
Filed Nov. 22, 1932  6 Sheets-Sheet 5

Witness:
V. Siljander

Inventor
Martin G. Boerger
By:
Hill & Hill  Attys.

April 2, 1935.                M. G. BOERGER                1,996,566
                  MACHINE FOR FABRICATING RADIATOR CORES
                     Filed Nov. 22, 1932         6 Sheets-Sheet 6

Witness:
V. Silgander

Inventor
Martin G. Boerger
By:
Hill & Hill    Attys.

Patented Apr. 2, 1935

1,996,566

UNITED STATES PATENT OFFICE 1,996,566

MACHINE FOR FABRICATING RADIATOR CORES

Martin G. Boerger, Racine, Wis., assignor to Modine Manufacturing Company, Racine, Wis., a corporation of Wisconsin Application November 22, 1932, Serial No. 643,884

13 Claims. (Cl. 29—84)

The invention relates to a machine for fabricating a radiator core, the core being comprised of tubes and fins, the latter being arranged upon the tubes and maintained in definite spaced relation to each other transverse of said tubes.

The invention has as one of its principal objects the provision of a machine capable of receiving strips of material to be employed as fins and consecutively presenting them to the tubes, arranging the fins upon the tubes and moving the fins relatively to the tubes to a position in which said tubes are retained in definite spaced relation to each other.

It is another object of the invention to provide means whereby the assembled tubes and fins are moved a predetermined distance for each fin applied to the tubes, this means being capable of manipulation so that the distance between fins may be varied to increase or diminish the distance or space between said fins.

It is a further object of the invention to provide means whereby the tubes are moved in synchronism with the means for presenting the fins to the tubes at a certain period of travel of said means to thereby effect equal spacing of the fins upon the tubes.

It is an object of the invention to employ the means for presenting the fins to the tubes as a guide and support for the tubes, the means for presenting the fins to the tubes being movable lengthwise of the tubes, the assembled fins and tubes being intermittently movable a predetermined distance in the direction of travel of the means which applies the fins to the tubes to thereby space the fins a definite distance from each other.

It is another object of the invention to provide means for automatically feeding fins to the means for applying the fins to the tubes.

Another object of the invention is to provide the means for presenting the fins to the tubes with means for holding the fins relatively thereto to thereby prevent displacement of the fins relatively to said means during movement thereof in the direction of the tubes.

The invention has these and other objects, all of which will be explained in detail and more readily understood when read in conjunction with the accompanying drawings, it being manifest that changes and modifications may be resorted to without departing from the spirit of the appended claims forming a part hereof.

In the embodiment of the invention illustrated in the drawings, certain mechanisms are shown as actuated by separate motors, however, it is understood that this arrangement is resorted to merely to simplify illustration and it is within the province of any mechanic to provide for operation of both mechanisms by a single motor.

The structure illustrated contemplates the utilization of a main frame 10 having a hopper generally designated 11 from which strips providing heat radiating fins are fed to another element of the machine. The fins are successively released from the hopper 11 and fed to an endless conveyor generally designated 12, the conveyor being mounted upon sprockets rotatable about shafts 13 and 14 supported by the side frames of the main frame 10. The main frame 10 supports a table 15 upon which is slidably mounted a head 16. The head 16 is movable from one end such as 17 of the table to the opposite end 18 thereof and is employed to retain the tubes 19 which enter into the radiator core structure in proper relation to elements of the conveyor so that said elements may present the fins 20 to the tubes and advance the fins along the tubes.

The head 16 engages one end of the tubes 19 and is intermittently movable in synchronism with the conveyor 12 to thereby effect spacing of the fins upon said tubes. It is understood that the fins 20 are provided with openings for the reception of the tubes and are movable in the direction of the head 16 with the head upon movement of said head by virtue of frictional engagement between the fins and tubes.

The intermittent movement of the head 16 in the direction of the end 17 of the table is effected through the medium of the tooth element or cam 21 which actuates the rod 22, and applies motion thereto which is transmitted to a gear train generally designated 23. This gear train is operatively connected with a worm shaft 24 which provides a means for moving the head 16 in the direction of the end 17 of the table 15. It is understood that reverse motion of the worm 24 will move the head 16 in the direction of the end 18 of the table 15 to thereby maintain a temporary frame consisting of the tubes 19 and movable frame elements 25 in proper relation for cooperation with elements of the conveyor 12.

It may be here stated that the temporary frame consisting of the tubes 19 and the strips 25 is arranged relatively to the conveyor so that the tubes 19 and the frame elements 25 extend in the plane of movement of certain elements of the conveyor and, therefore, upon the initial operation of the conveyor, these frame elements 25 will be engaged by said elements of the conveyor and be moved toward and against the front face of the head 16 which will clear the tubes for the presentation of strips providing the fins. The head 16 is provided with centering elements 28 which cooperate with the tubes and assist to prevent displacement of the tubes and said head.

As before stated, certain portions of the structure such as for instance the conveyor is shown as being actuated by a separate motor. The motor for actuating the conveyor 12 is designated 26 and is suitably connected with the shaft 13 of the conveyor, clutch 27 being employed to control operation of said conveyor. Manifestly, since the conveyor receives strips ejected from the hopper 11 and is operable toward the tubes 19, said conveyor will present the strips to the tubes and move said fins to a certain position upon said tubes. Since the head 16 moves in the direction of the end 17 of the table, it is evident that the tubes 19 will be correspondingly moved which will arrange the fins 20 applied to the tubes by the conveyor in definite spaced relation upon said tubes, the spacing being dependent upon the movement of the head 16 in the direction of the end 17 of the table.

Again referring to the hopper 11, it will be noted that a means generally designated 29 is employed for controlling the discharge of strips from the hopper. This means, in the present instance, is of electro-magnetic character and its operation is controlled through the medium of the elements of the conveyor generally designated 30. These elements 30 cooperate with a lever 31 which controls operation of the electro-magnetic device 29 and thus in this manner escape of the strips 20 from the hopper is regulated.

The hopper generally designated 11 is provided with a ledge 32 which is adapted to engage one edge of the lowermost strip contained in the hopper, the opposite edge of the stack is engaged in a manner to hold this edge of the fin against displacement relatively to the hopper. The electro-magnetic element 29 illustrated is comprised of a pair of solenoids respectively designated 33 and 34, each of which is provided with strip holding elements generally designated 35 and 36 which are consecutively operable to control escape of the strips or fins 20 from the hopper, it being understood that the holding elements 35 and 36 are moved in one direction upon energization of the solenoids and are moved in the opposite direction by springs 37 and 38.

The holding elements 35 and 36 have the holding portions thereof disposed relatively to each other so that one is arranged in advance of the other. These elements are alternately operable and, therefore, will allow the escape of one strip and hold the remaining strips against removal from the hopper. When the solenoid 34 of the element 35 is energized, it will cause retraction of this holding element and allow the lowermost fin in the stack to move into engagement with the holding element 36. Manifestly, when the solenoid of the element 36 is energized, this will cause retraction of the element 36 and allow the lowermost fin to escape from the stack, it being understood that during this operation, the holding element 35 is moved so as to engage the next fin of the stack and hold same against removal from the hopper.

As the fins escape from the hopper, they travel along the wall 39 toward the conveyor generally designated 12 for engagement by the elements 30 thereof to thereby convey the strips from the hopper toward the tubes 19 and present said fins to said tubes and move said fins relatively to the tubes in the manner hereinbefore described.

The wall 39 has that edge thereof adjacent the conveyor 12 provided with a plurality of spaces or openings 41 which are provided to allow the elements 30 of the conveyor to pass and engage the strips or fins 20 to allow the strips to be carried toward the tubes 19.

Means is provided for securing the strips or fins 20 to the elements 30 of the conveyor to prevent displacement of the strips relatively to the conveyor during travel of the conveyor. The means employed for accomplishing this advantage may be of any desired character, however, that herein shown consists of pins 42 extending from one face of the elements 30 and an element 43 which in effect produces a hammer which will apply a blow to the strips or fins and secure said strips to said pins.

The means for controlling actuation of the hammer 43 consists of a trigger 44 which is adapted to cooperate with the hammer 43 and hold same so that upon release of the hammer, same will apply the necessary blow to secure the strips to the pins of the elements 30. The trigger 44 and the hammer 43 are respectively provided with elements 45 and 46 which provide a catch for releasably holding the hammer in an ineffective position. During operation of this last mentioned structure, the elements 30 of the conveyor engage the hammer 43 and move it in the direction of the catch 45 bringing the element 46 of the catch into proper relation with the element 45 so that the hammer 43 is held in an elevated position. The trigger 44 is movable into a position to allow cooperation between the elements 45 and 46 and is movable by the elements such as 30 of the conveyor to effect movement of the trigger 44 to release the hammer so that this last mentioned element may apply a blow to the strip or fin and cause the pins 42 to indent or perforate the strips and thus hold the strips with relation to each of the elements 30 of the conveyor.

From the foregoing, it is believed evident that the strips are held against displacement with relation to the conveyor so that openings in the strips are held in proper relation to permit the strips or openings thereof to be properly presented to the tubes 19 during movement of the conveyor in the direction of the tubes.

Figure 1:
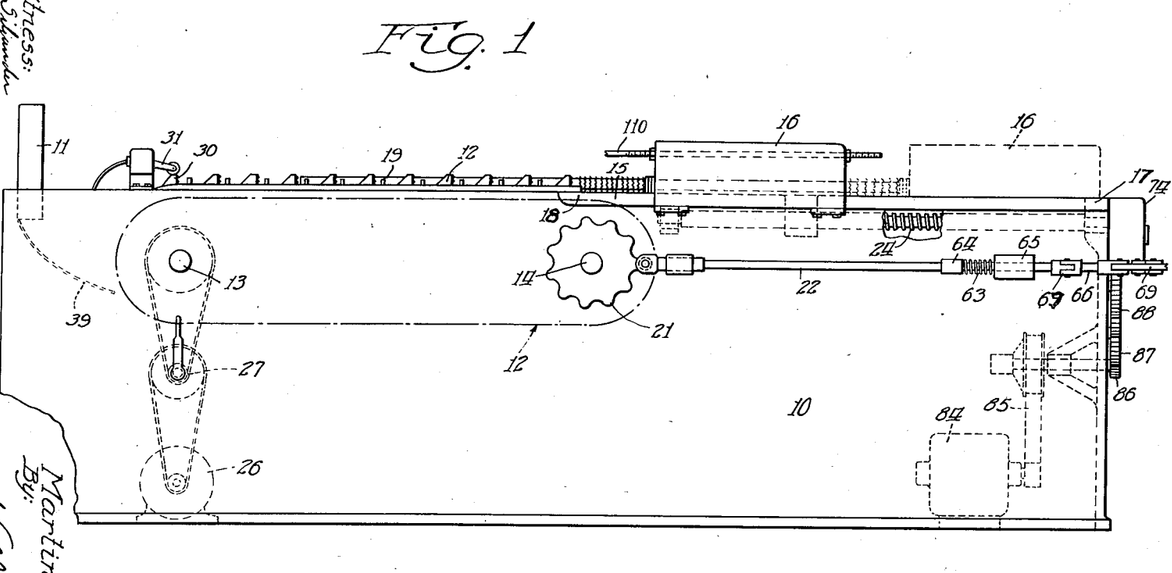
Fig. 1 is a side elevation partly in section showing a machine constructed according to one embodiment of the invention.
Figure 2:
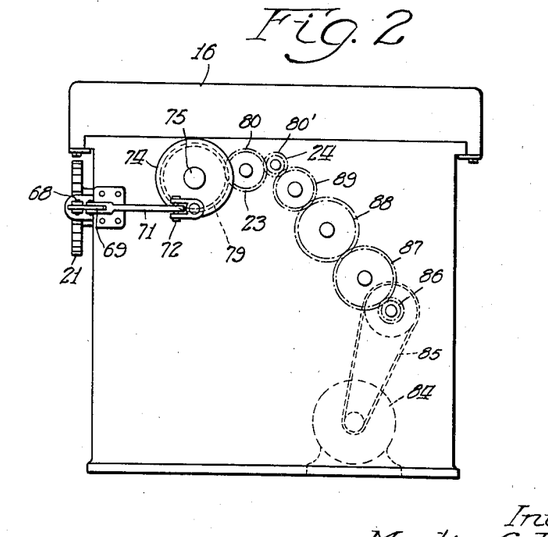
Fig. 2 is a view of one end of the structure shown in Fig. 1.
Figures 3, 13:
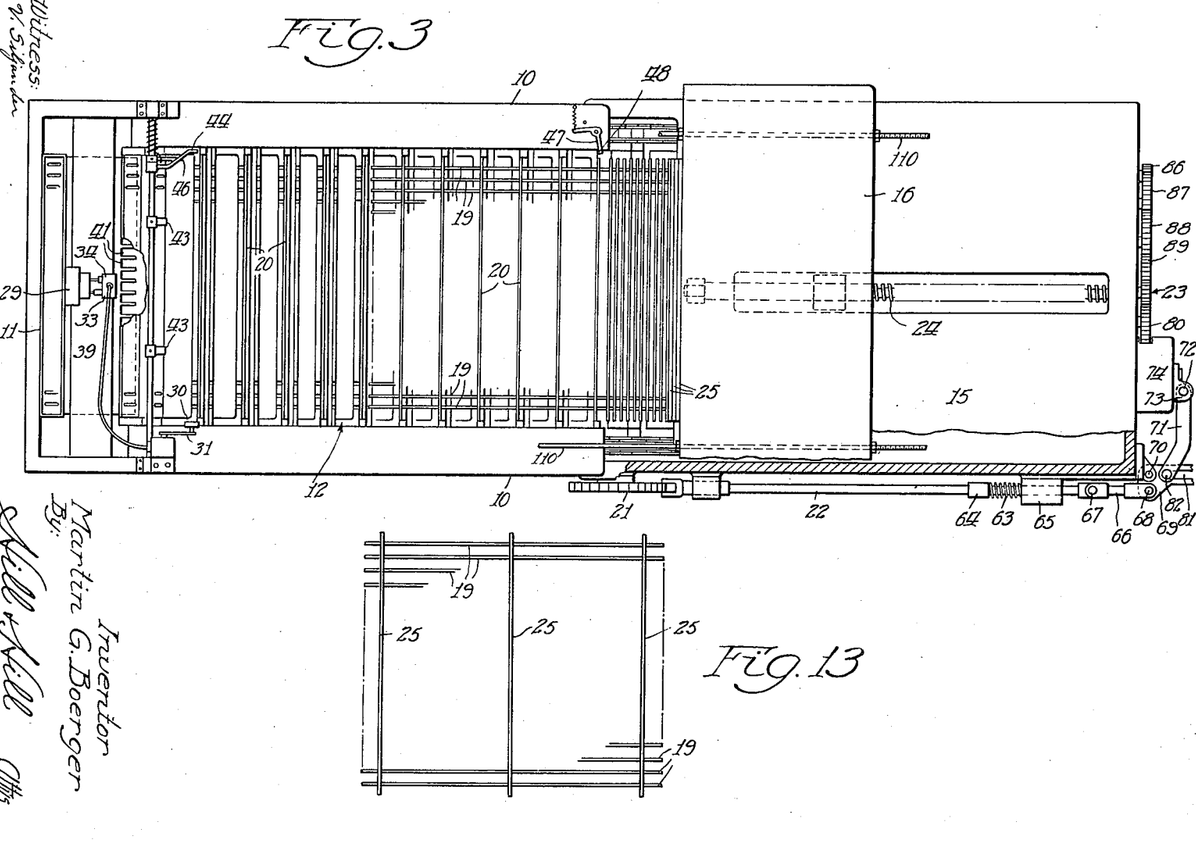
Fig. 3 is a plan view of the structure shown in Fig. 1.
Fig. 13 is a plan view of a temporary frame consisting of tubes and frame elements, the latter of which are moved along the tubes to allow the strips to be arranged upon the tubes.

A means is provided for arranging the elements 30 of the conveyor so that these elements will be disposed to clear the fins and tubes and allow the elements 30 to pass the end 18 of the table 15 after the fins have been arranged at the desired location upon the tubes or, in other words, a position determined by movement of the head 16 in the direction of the end 17 of the table. This structure is shown in detail in Figs. 3 and 5 and consists of a trip element 47 which is of a resilient character and is provided to engage a face such as 48 of the elements 30. It may be here stated that the elements 30 of the conveyor are provided with a guide element such as that designated 49 which travels between an upper guide rail 50 and a lower guide rail 51 which will hold the elements 30 in proper relation to other elements of the structure during operation of the conveyor. The trip 47, as before stated, applies a resilient resistance to movement of the elements 30 of the conveyor and when the portion 49 of the elements 30 reaches the termination of the lower guide 51, this resilient pressure applied by the trip 47 to the elements 30 of the conveyor will cause pivotal movement of the respective elements upon the pivot 52 causing the individual elements to assume a position permitting same to clear the assembled fins and tubes and also clear that end of the table adjacent the front face of the head 16 and allow these elements 30 to travel without interference with said fins and tubes or other elements of the structure. The elements 30 travel about the axis of the shaft 14 and thus the guide elements 49 thereof are brought into engagement with the trip 54' and guide rails respectively designated 53 and 54 which will again arrange and hold the elements 30 in a relation to properly present them to the edge 40 of the wall 39 of the hopper 11.

Figure 4:
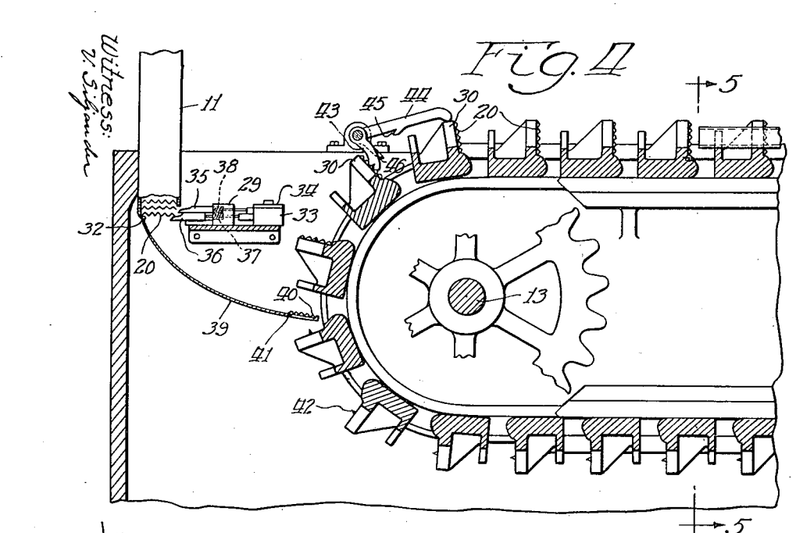
Fig. 4 is a sectional view showing certain elements employed for conveying strips to the tubes to fabricate the core.
Figure 5:
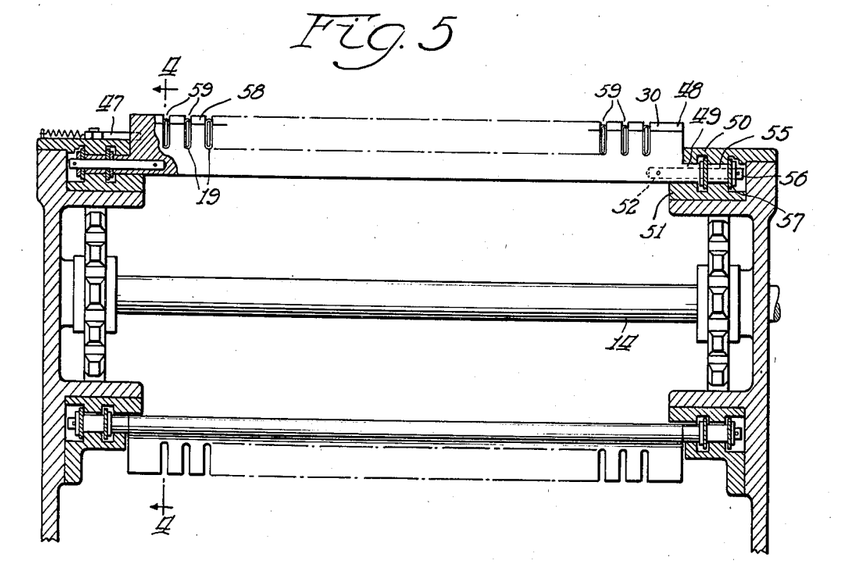
Fig. 5 is a section taken on line 5—5 of Fig. 4.
Figure 6:
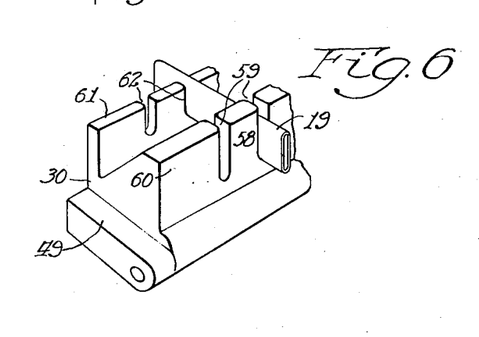
Fig. 6 is a perspective view of a portion of one of the elements shown in Fig. 4.
Figure 7:
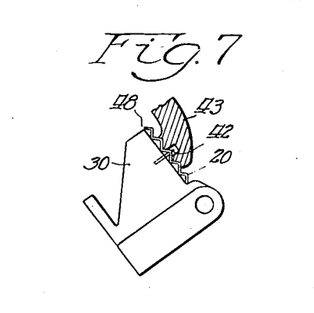
Fig. 7 is a view illustrating a portion of means for securing a strip to the elements for conveying the strip to the tubes.
Figure 8:
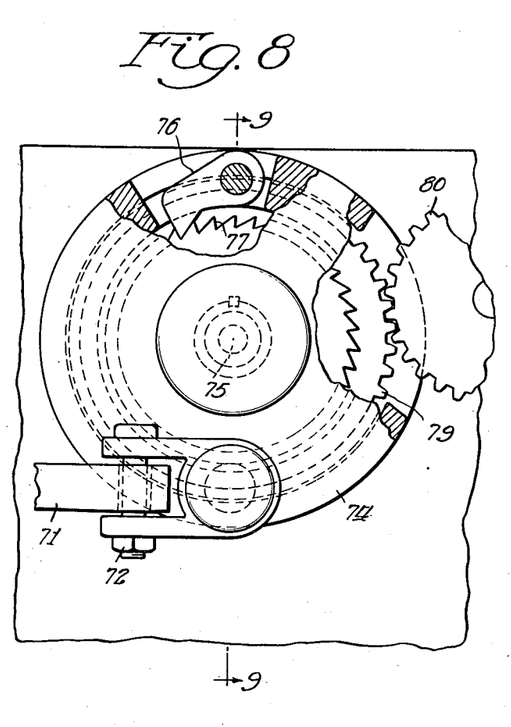
Fig. 8 is a side view partially in section of an element of means for controlling movement of the tubes.
Figure 9:
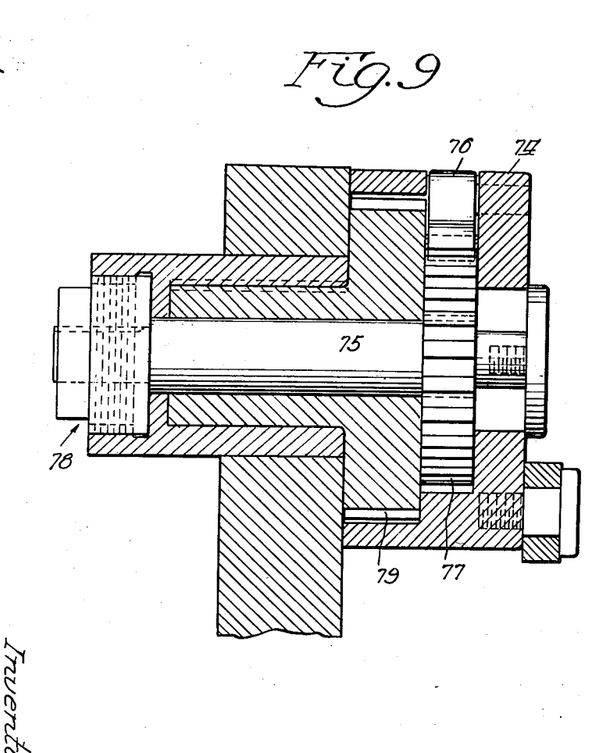
Fig. 9 is a section taken on line 9—9 of Fig. 8.

Each of the elements 30 of the conveyor 12 is, as before stated, adapted to travel and be held between guide rails such as 50 and 51 as most clearly shown in Figs. 4 and 5, it being understood that the guide rails are secured to the side frames of the main frame 10 and that the portion 49 cooperates with the guide rails to hold the elements 30 in proper relation to other elements of the structure to thereby properly present the elements 30 to the ends of the tubes 19. The guide rails 50 and 51 include tracks for the anti-friction rollers 55 of the chain of the conveyor. These anti-friction rollers are arranged upon a shaft 56 which is connected with the links 57 of the chain of the conveyor generally designated 12, and extend from the opposite ends of the elements 30 of the conveyor. These elements 30 of the conveyor extend transverse of the main frame of the machine and are of a length substantially corresponding to the distance between the main frames and each of these elements 30 is constructed to form a wall 58 having a plurality of slots 59 provided therein. The wall 58 forms means for supporting the strips and the slots provide a structure capable of receiving the ends of the tubes and permit the elements 30 to travel lengthwise of the tubes, it being understood that the portion 49 of each of the elements 30 is guided and held in the guide or track formed by the elements 50 and 51.

In addition to the structure just referred to, each of the elements 30 is provided with portions such as 60 which act as a cam to cause operation of the switch arm 31 and this controls the operation of the electro-magnetic means which controls the escape of fins from the hopper 11 and in addition provide a surface with which the trip 47 is adapted to cooperate to cause movement of the elements 30 upon their pivots 52 when the guide 49 of the said elements reaches a position relatively to the guide rail 51 to permit of this action.

If so desired, each of the elements 30 may be provided with a vertical wall 61 having slots 62 provided therein which register with the slots 59 of the wall 58. These slots 59 and 62 form guides for the tubes 19 and hold the tubes in proper parallel relation to each other so as to insure feeding of the strips 20 upon the tubes.

As before stated, the cam element 21, the rod 22 and elements connected with said rod enter into a construction for actuating the worm 24 to cause movement of the head 16 toward the end 17 of the table 15 to effect spacing of the strips relatively to each other. The rod 22 has a coil spring 63 arranged thereon which reacts between a member 64 secured to the rod 22 and the bearing 65 which projects from the main frame. A link 66 is employed, this link having one end pivotally connected at 67 with the rod 22 and having the opposite end thereof such as 68 pivotally connected with a bell crank lever 69, which bell crank lever is pivotally connected at 70 with the main frame. A link 71 is also employed which has one end connected with the bell crank lever and has the opposite end such as 72 pivotally connected at 73 with the oscillatory housing 74. This housing 74 is rotatable about the shaft 75 and has a dog 76 adapted to cooperate with a ratchet 77 which is secured to the shaft 75 to thus impart rotative motion to said shaft upon reciprocation of the rod 22.

The shaft 75 has a clutch 78 provided thereon which transmits motion of the shaft 75 to a gear 79 rotatable about the axis of the shaft 75 when said shaft 75 is rotated in one direction. The clutch 78 is provided to allow the worm 24 to be rotated in one direction by the ratchet mechanism and allow the worm 24 to be rotated in the opposite direction without injury to certain other driving elements connected with the worm. The gear 79 meshes with the gear 80 and this gear 80 meshes with a pinion 80' provided upon the worm shaft to thus transmit or impart the reciprocable motion applied to the rod 22 to the worm 24 to thus cause the head 16 to be moved in a rearward direction or in a direction toward the end 17 of the table 15.

As before stated, the mechanism involves a structure whereby the machine may be set to provide for varying the distance between the strips arranged upon the tubes and to maintain a definite spacing between said strips. In other words, the mechanism is such that the number of fins per inch may be varied to suit the conditions which the radiator is designated to accommodate. The mechanism for accomplishing this last mentioned advantage includes that just described and particularly the bell crank lever 69 and the link 71 which is connected with the rotatable housing 74. To accomplish this advantage, the bell crank lever 69 is provided with a slot 81 and the link 71 is provided with a releasable connection 82 whereby the adjacent end of the link 71 may be moved with relation to the slot 81 and be held in various positions of adjustment in the slot. Manifestly, when the position of the last mentioned end of the link 71 is changed relatively to the slot 81 of the bell crank lever 69, movement of the housing 74 will be correspondingly varied and thus cause the dog 76 to be moved relatively different distances about the periphery of the ratchet wheel 77 and thus impart a relatively different motion to the shaft 75. Since the gear 79 is connected to the shaft, this relatively different degree of rotation will be imparted to the gear 80 and the pinion 80' secured to the worm shaft. Since the head 16 is connected for actuation with the worm shaft, it is evident that the degree of movement of the head is dependent upon the position which the end of the lever 71 bears to the bell crank lever. It is believed evident from the foregoing description that upon rotation of the cam 21, the head 16 will be moved in a longitudinal direction or caused to retreat toward the end 17 of the table.

As before stated, the machine is operable to cause a relatively rapid movement of the head 16 toward that end of the table 15 opposite to the end 17 thereof so that another frame consisting of tubes and frame elements 25 may be positioned to receive strips from the conveyor. As before stated, this means is illustrated as being driven by a motor which is separate from the motor for actuating the conveyor 12, it being understood, however, that it is within the range of mechanical skill to actuate the conveyor and other elements connected therewith and the head 16 by a single motor.

The mechanism shown for causing rapid advancement of the head 16 includes a motor 84 having a belt and pulley connection 85 which is connected with a pinion 86, the latter meshing with a train of gears including gears 87, 88 and 89, one of which meshes with the pinion 80' secured to the worm shaft 24. Manifestly, when the motor 84 is actuated, the worm 24 will be rotated in a direction reverse from that motion imparted to it by the mechanism including the dog and ratchet respectively designated 76 and 77 and the gear 23 and it may be here stated that this reverse motion may, by virtue of the clutch 78, take place without impairing any of the mechanism such as that including the gears 23 and 79.

The construction of the elements 30 of the conveyor as previously explained is designed to fabricate a radiator core employing a single bank of tubes, however, the structure is capable of use to fabricate a radiator core involving a plurality of banks of tubes. This change of structure only involves modifying the construction of the several elements 30 of the conveyor to arrange for the acceptance of two banks of tubes instead of one.

Figures 10, 11, 12:
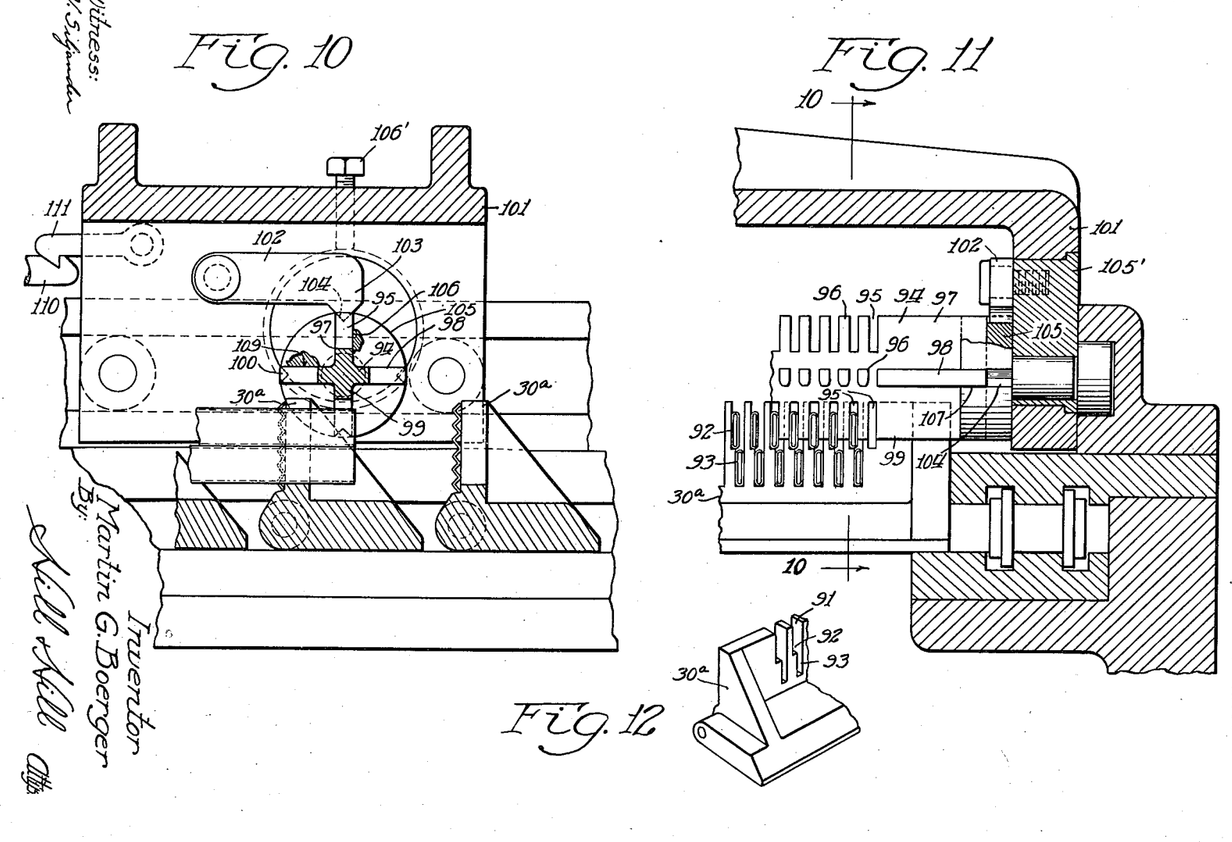
Fig. 10 is a section taken on line 10—10 of Fig. 11.
Fig. 11 is a sectional view of a device employed when fabricating a core having a plurality of banks of tubes.
Fig. 12 is a perspective view of a portion of a modified conveyor element.

A structure which has been found adaptable for this purpose is shown in Figs. 10 to 12, from an inspection of which it will be noted that the elements generally designated 30a are formed to provide spaces 91 having portions such as 92 and 93 which are offset with relation to each other so that each of these spaces will accommodate and support a plurality of tubes which, in the present instance, are offset relatively to each other. The structure illustrated may also involve the use of a rotatable element such as that designated 94 which extends across the machine and is arranged above the elements 30a. This element 94 is provided with a plurality of spaces 95 and projections 96, the spaces being arranged relatively to the spaces 92 of the elements 30a so that these portions register with each other. The spaces 95 and projections 96 are provided in the longitudinally extending spaced ribs such as 97, 98, 99 and 100, which ribs are adapted to be respectively engaged by fins carried by the elements 30a and rotated so as to allow the fins to clear the next rib upon rotation of this element 94.

This element 94 is rotatably mounted upon a bracket 101 which carries a locking pawl 102 which is pivotally connected with the bracket, the end 103 of the pawl being adapted to enter notches such as those designated 104 provided in the periphery of the element 105, which element is carried by the adjustable disc 105' which is held in adjusted position by the set screw 106' and is employed to effect proper arrangement of the element 94 with respect to the ends of the tubes. This element 105 is provided with the transversely arranged recesses 106 and 107 which are provided for the reception of an end of the element 94, it being understood that the opposite end of the element 94 is mounted in an element similar to that designated 105. It is believed to be clear that this mechanism just referred to provides means for holding the respective tubes of the uppermost bank of tubes in proper parallel relation to each other and will allow the strips providing the fins to pass and be moved to their proper position upon said tubes. Rods 110 project from the head 16 to the frame 101, the rods being separately locked to the frame by means of the holding elements 111 which engage a notch provided in each of the rods. It is understood that the head 16 is adjustable relatively to the rods 110 so as to compensate for tubes of different lengths and that the head and the frame 101 move with each other upon movement of the head.

From the foregoing description of the structure, it is believed that it is manifest that a machine is provided capable of fabricating a radiator core comprised of tubes and fins which is capable of accommodating a frame comprised of tubes and frame elements which is arranged in a manner for support by a conveyor which, upon initial operation of the conveyor, will cause the frame elements just referred to to be moved to one end of the tubes so that the remainder of said tubes are capable of accepting the strips or fins. It is further evident that as the conveyor is actuated, same will pick up fins ejected from the hopper and carry same toward said tubes, and arrange said fins upon the tubes and move same along the tubes until said fins are arranged at a certain predetermined position upon said tubes, at which time, the fin and tube structure thus far fabricated will, by virtue of movement of the head 16, be moved a predetermined distance causing the adjacent strip or fin to assume a certain specified distance from the preceding fin and thus fabricate the radiator core. It is also believed evident that means is provided for causing the elements such as 30 and 30a to be moved in a manner so as to clear the fins located at one end of the tubes so as to not interfere with the set or spaced relation of the fins. It is also believed to be manifest that a structure is provided whereby the spacing between the fins may be varied to either increase or diminish the number of fins per inch. In addition to the above, it is believed to be clear that the mechanism for controlling discharge of the strips or fins from the hopper is such that the individual fins will be fed from the hopper in such time that they will be picked up by the proper element 30 and be carried toward the tubes and be moved along the tubes and arranged upon the tubes at a certain portion of said tubes.

Having thus described my invention, what I claim and desire to cover by Letters Patent is:

1. In a machine for fabricating a radiator core comprising tubes and fins, the combination of a conveyor, said conveyor providing means for supporting said tubes and presenting fins to said tubes, means for resisting endwise movement of said tubes relatively to said conveyor, and variable means for controlling movement of said resisting means, said resisting means providing means for predetermining the spaced relation of said fins to each other upon said tubes.

2. In a machine for fabricating radiator cores comprising tubes and fins, a magazine for storing the fins, a movable head for supporting one end of the tubes and controlling their longitudinal position, a conveyor and means upon the conveyor for controlling the free ends of said tubes in combination with automatic means for successively releasing the fins from said magazine, means for presenting the released fins one by one to said conveyor, means upon the conveyor for engaging the fins thus presented carrying the same to and threading the same upon said tubes, and means for intermittently moving said head a predetermined distance from each fin threaded upon the said tubes.

3. In a machine for fabricating radiator cores comprising tubes and fins, a magazine for storing the fins, a movable head for supporting one end of the tubes and controlling their longitudinal position, a conveyor comprising a plurality of flexible members mounted upon rotatable carrying means, and means upon the conveyor for controlling the free ends of said tubes in combination with means for successively releasing the fins from said magazine, an inclined wall below the magazine for receiving and presenting the released fins one by one to said conveyor, means upon the conveyor for engaging the fins thus presented carrying the same to and threading the same upon said tubes, and means for intermittently moving said head a predetermined distance away from said magazine.

4. In a machine for fabricating radiator cores comprising tubes and fins, a magazine for storing the fins, a movable head for supporting one end of the tubes, and controlling their longitudinal position, and a conveyor comprising a plurality of flexible members mounted upon rotatable carrying means for controlling the free ends of said tubes in combination with means for successively releasing the fins from said magazine, means for presenting the released fins one by one to said conveyor, means upon the conveyor for engaging the fins thus presented carrying the same to and threading the same upon said tubes, mechanism controlled by said conveyor for positively engaging each fin with said conveying means and means for intermittently moving said head a predetermined distance away from said magazine.

5. In a machine for fabricating radiator cores comprising tubes and fins, a magazine for storing the fins, a movable head for supporting one end of the tubes and controlling their longitudinal position, a conveyor comprising a plurality of flexible members mounted upon rotatable carrying means, and means upon said conveyor for controlling the free end of said tubes, in combination with means at the lower end of said magazine for supporting the fins in the magazine, means for successively releasing the fins from said magazine, means for presenting the released fins one by one to said conveyor, means upon the conveyor for engaging the fins thus presented carrying the same to and threading the same upon the said tubes, mechanism controlled by said conveyor for positively engaging each fin with said conveyor means, and means for intermittently moving said head a predetermined distance for each fin threaded upon the tubes.

6. In a machine for fabricating radiator cores comprising fins and tubes, a magazine for storing the fins, a movable head for supporting one end of the tubes and controlling their longitudinal position, and a conveyor provided with means for controlling the free ends of said tubes in combination with means for successively releasing the fins from said magazine, an inclined wall below the magazine for receiving and presenting the released fins one by one to said conveyor, means upon the conveyor for engaging the fins thus presented carrying the same to and threading the same upon said tubes, mechanism controlled by said conveyor for positively engaging each fin with said conveyor, and means for intermittently moving said head a predetermined distance away from said magazine.

7. In a machine for fabricating radiator cores comprising tubes and fins, a magazine for storing the fins, a movable head for supporting one end of the tubes and controlling their longitudinal position, and a conveyor provided with means for controlling the free ends of said tubes in combination with means for successively releasing the fins from said magazine, means for presenting the released fins one by one to said conveyor, means upon the conveyor for engaging the fins thus presented carrying the same to and threading the same upon said tubes, and means for intermittently moving said head a predetermined distance for each fin threaded upon said tubes.

8. In a machine for fabricating radiator cores comprising tubes and fins, a magazine for storing the fins, a movable head for supporting one end of the tubes, and controlling their longitudinal position, and a conveyor provided with means for controlling the free ends of said tubes in combination with automatic means for successively releasing the fins from said magazine, means for presenting the released fins one by one to said conveyor, means upon the conveyor for engaging the fins thus presented carrying the same to and threading the same upon said tubes, and means for intermittently moving said head a predetermined distance away from said magazine, and means for automatically disengaging said conveyor means from said fins at a predetermined point in the forward movement of said conveyor.

9. In a machine for fabricating radiator cores, comprising tubes and fins, a magazine for storing the fins, a movable head for supporting one end of the tubes and controlling their longitudinal position, a conveyor and means upon the conveyor for controlling the free ends of said tubes, in combination with automatic means controlled by the operation of said conveyor for successively releasing the fins from said magazine, means for presenting the released fins one by one to said conveyor, means upon the conveyor for engaging the fins thus presented carrying the same to and threading the same upon said tubes, and means for intermittently moving said head a predetermined distance away from said magazine.

10. In a machine for fabricating radiator cores comprising tubes and fins, a magazine, an endless conveyor and means upon said conveyor for supporting said tubes, in combination with means for automatically feeding fins from said magazine to said conveyor, means on the conveyor for moving said fins to and placing the same upon said tubes, and means synchronizing with the feeding of the fins to said conveyor for successively moving said tubes and fins a predetermined distance away from said magazine.

11. In a machine for fabricating radiator cores comprising tubes and fins, a magazine, an endless conveyor and means upon said conveyor for supporting said tubes, in combination with means controlled by the movement of said conveyor for automatically feeding fins from said magazine to said conveyor, means on the conveyor for moving said fins to and placing the same upon said tubes, and means synchronizing with the feeding of the fins to said conveyor for successively moving said tubes and fins a predetermined distance away from said magazine.

12. In a machine for fabricating radiator cores comprising tubes and fins, a magazine, an endless conveyor and means upon said conveyor for supporting said tubes, in combination with means for automatically feeding fins from said magazine to said conveyor, means on the conveyor for moving said fins to and threading the same upon said tubes, and means synchronizing with the feeding of the fins to said conveyor for successively moving said tubes and fins a predetermined distance away from said magazine, and means for automatically disengaging said moving means from each fin at a predetermined point during the forward travel of said moving means.

13. In a machine for fabricating radiator cores comprising tubes and fins, a magazine, an endless conveyor, and means upon said conveyor for supporting said tubes, in combination with means controlled by the movement of the conveyor for automatically feeding fins from said magazine to said conveyor, means on the conveyor for moving the fins to and threading the same upon said tubes, means for successively moving said tubes and fins a predetermined distance away from said magazine, and means for automatically disengaging said moving means from each fin at a predetermined point during the forward travel of said moving means.

MARTIN G. BOERGER.